Patented Aug. 4, 1925.

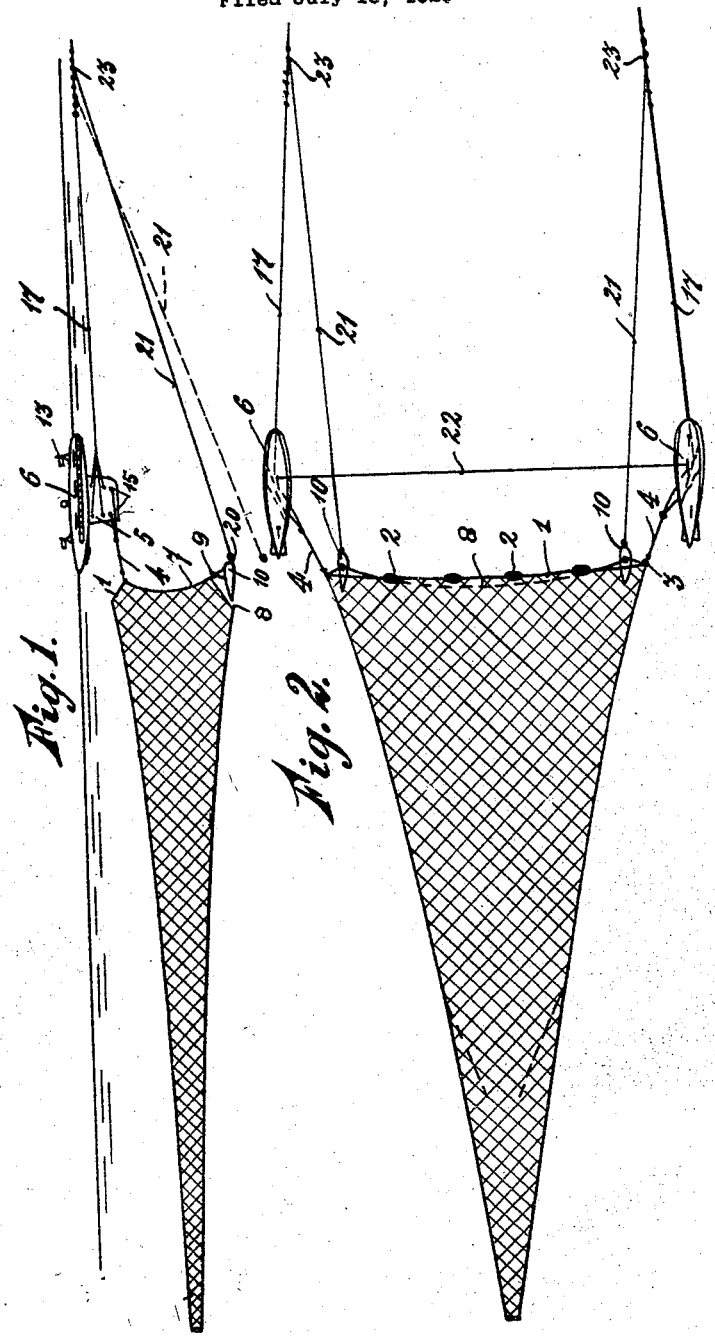

1,548,412

UNITED STATES PATENT OFFICE.

HENRI WILLEM DE VOOGT AND ROELOF DE BOER, OF HEEMSTEDE, NETHERLANDS.

NET FOR CATCHING HERRINGS OR OTHER PELAGIC FISHES.

Application filed July 16, 1923. Serial No. 651,911.

*To all whom it may concern:*

Be it known that we, HENRI WILLEM DE VOOGT and ROELOF DE BOER, residing at Heemstede, the Netherlands, have invented certain new and useful Improvements in Nets for Catching Herrings or Other Pelagic Fishes, of which the following is a specification.

The present invention has reference to nets which may be used for catching herring or other pelagic fish (no ground fish) and more specially to that class of nets which are suspended from floating bodies at the surface of the water and trawled by a vessel.

The invention has for its object to construct a net, that may be used as a trawlnet either at the surface or at a depth below the waterlevel, that may be adjusted as required.

The invention comprises a suitable construction of the mouth or opening of the net and its suspension from floating bodies towed by the trawler, as well as a method for adjusting the net at different depths below the water surface.

The opening of the net is formed by an upper and a lower cable and two vertical side cables. The ends of the upper cable are suspended from floating boats. All otter boards below the waterlevel are avoided and the sheering action exerted on the cables of the mouth is only obtained by sheering keels attached to the floating boats, which are trawled. The ends of the lower cable are provided with sinkers, towed by branch lines of the towing ropes of the boats.

The two floating boats may be connected to each other by a free cable so as to limit the amount of spread to a predetermined distance in accordance with the depth at which the net is to be trawled.

The keels of the floating boats being the only elements acting as otter board used in ground nets, are preferably box-shaped, double walled boards showing in horizontal section a flat or convex inner wall and a convex outer wall.

The invention will be more fully understood with reference to the accompanying drawings illustrating a net according to the invention by way of example.

Figure 3:
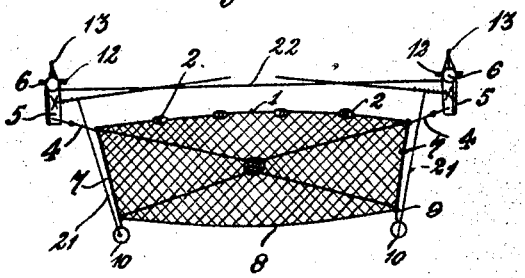
Figure 4:
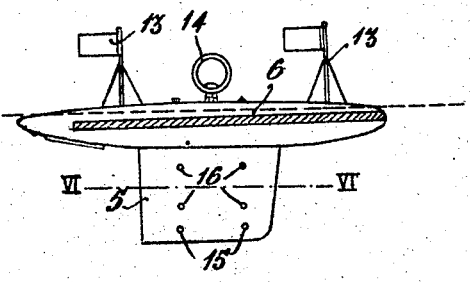
Figure 5:
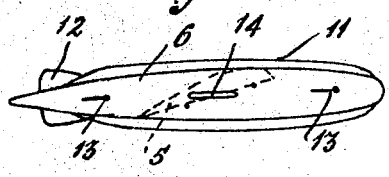
Figure 6:
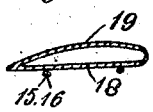

Fig. 1 is a side elevation.
Fig. 2 is a plan view.
Fig. 3 a front elevation of the net.
Fig. 4 is a side elevation of a little boat on a larger scale.
Fig. 5 is a plan view of a floating boat and
Fig. 6 is a horizontal section through the keel on the line VI—VI in Fig. 4.

The substantially rectangular mouth or opening of the net is formed by four cables viz the upper cable 1, the lower cable 8 and the two side cables 7.

The upper cable 1 is held up over its length by means of usual small cork floats 2 and is at its outer ends 3 (Fig. 2) suspended from the keels 5 of two floating boats 6 by means of lines 4.

From the ends 9 (Fig. 3) of the lower cable 8 sinkers 10 are suspended.

The floating boats 6 may be hollow or solid; they are torpedo shaped as indicated in Figs. 4 and 5 of the drawings. This shape has for its object in the first place to offer the smallest possible resistance during trailing and further to prevent the body from plunging downwards under the action of overflowing waves. The boats are provided with a wale 11, a height rudder 12, and distinctive or direction flags 13 as well as a hoisting eye 14. The rudder 12 consists of two blades, about horizontally placed respectively at the right and the left rear side of the boat. Its object is to counteract a downwardly directed movement of the boat, caused either by the tension of the towing rope or by overflowing waves. The keel 5 of these boats is disposed under a certain angle with respect to the axis of the boat and during trailing produces the necessary outwardly directed sheering force whereby the upper cable is kept stretched.

The lower eyes 15 secured to these keels serve for suspending the line 4; to the four upper eyes 16 the chains are attached to which the trailing line 17 of the net is connected.

The horizontal section of the keel is shown in Fig. 6. The keel consists of a box-shaped body, the two vertical side-walls of which are shaped in such a manner that during trailing through the water they are subjected to the smallest possible resistance, while a large sheering effect is obtained. In constructing these keels the experience made in modern aero-technics is taken into account. The inner wall is indicated by 18, the outer wall by 19. To the inner wall the eyes 15 and 16 are attached. The inner wall 18 is flat but it may be convex. The outer wall 19 is convex. The sinkers 10, that are torpedo shaped in order to diminish the resistance during the trailing through the water as much as possible, are provided at the front side with a ring 20 to which a line 21 is secured for trailing the lower cable. This line 21 is branched off from the line 17 by means of which the net is trailed by the vessel.

In order that the net may be trailed at different depths under the water level the length of the lines 4 may be altered while the connecting point of the branch line 21 is shiftable with respect to the line 17 as indicated at 23 in Fig. 1.

To make possible the moving of the net below the waterlevel, the two floating boats are connected to each other by a cable 22, as already mentioned above.

If it desired to trail at a certain depth below the level cables 4 are inserted of a greater length, whereas moreover the branchline 21 with its end 23 is attached into an eye of the line 17, situated more to the left as indicated by dotted lines in Fig. 1 of the drawing.

Should the cable 22 be lifted out, the floating bodies 6 would be spread outwardly at such a distance from each other that the lines 6 were pulled horizontally or nearly horizontally causing the whole net to be lifted to the surface of the water, as readily has taken place in practice.

The net may be arranged as follows: For a certain depth two lines 4 are used tagged for instance with A. These lines A belong together with a connecting cable 22, also tagged A, whereas the branchline 21 (of fixed length) with its end 23 is attached to the eye of line 17 which is also tagged A.

The corresponding parts, necessary to trail the net at another depth, are tagged B, etc. In this way the regulating of the desired depth is very much simplified.

It is also possible to use the net as a stationary net at places where there is pretty strong current. The net is then placed with the mouth opening in the direction from which the current is coming, is kept open by the current, while fish carried with the current is caught in the net.

The cables 17 are knit together at their ends and moored by means of an anchor to the bottom of the sea. The location of this anchor and of the net end may be indicated by a buoy.

Having now particularly described and ascertained the nature of our said invention and the manner in which the same is to be performed, we declare that what we claim is:

1. A trawlnet for herring fishing including a foraminous body having a substantially rectangular mouth composed of an upper cable, a lower cable and two vertical side cables, floating boats from which the ends of the upper cable are suspended, sheering keels depending from the boats, sinkers on the ends of the lower cable, and main trawling ropes connected with the floating boats and having branch lines connected with the ends of the lower cable.

2. A trawlnet as claimed in claim 1, wherein a free cable is connected between the said boats so as to limit the amount of spread according to the depth at which the net is to be trawled.

3. A trawlnet for herring fishing including in combination with a foraminous body having a mouth, floating boats from which the mouth of the net is suspended, a sheering keel on each boat and each keel being composed of vertical longitudinal walls the outer of which is curved convexly in horizontal cross-section.

4. A trawlnet for herring fishing including in combinatiin with a foraminous body having a mouth, floating boats from which the mouth of the net is suspended, a sheering keel depending from the boat and arranged approximately diagonally thereof with each keel consisting of spaced vertical longitudinal walls which meet each other at the front and rear edges and are rounded at such edges, the inner wall of each keel being straight in horizontal section while the outer wall of each section is curved convexly in horizontal section, substantially as and for the purposes set forth.

5. A trawlnet for herring fishing including in combination with a foraminous body having a substantially rectangular mouth, floating boats from which the mouth of the net is suspended, a sheering keel on each boat having two vertical longitudinal walls, the inner wall in cross-section being flat, the outer wall being curved transversely in cross-section and both walls being rounded at their meeting edges, substantially as and for the purposes set forth.

In testimony whereof we affix our signatures.

HENRI WILLEM DE VOOGT.
ROELOF DE BOER.